G. W. STUART.
VINE CUTTER.
APPLICATION FILED NOV. 13, 1919.
1,350,529.
Patented Aug. 24, 1920.
2 SHEETS—SHEET 1.
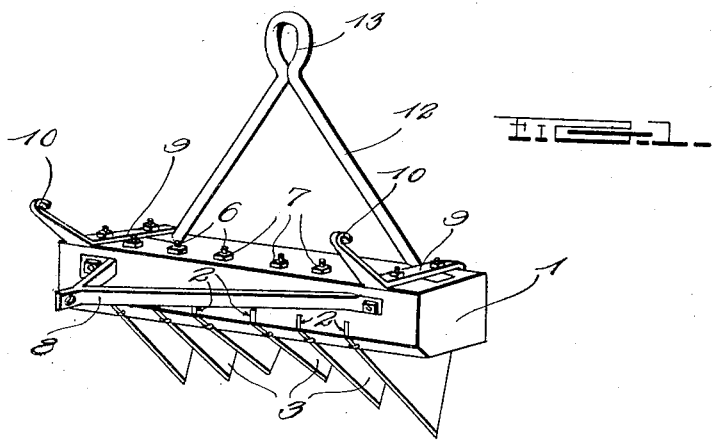
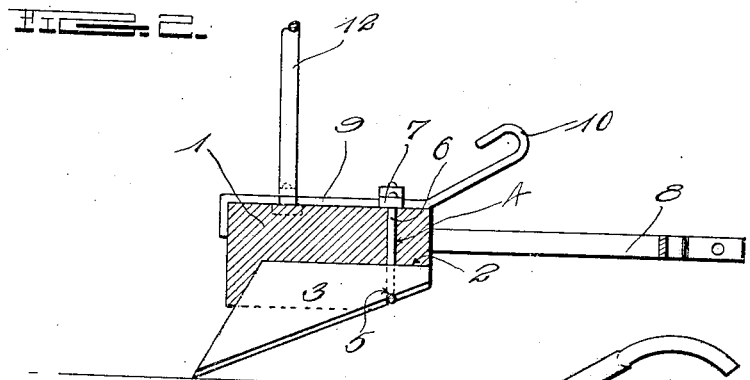
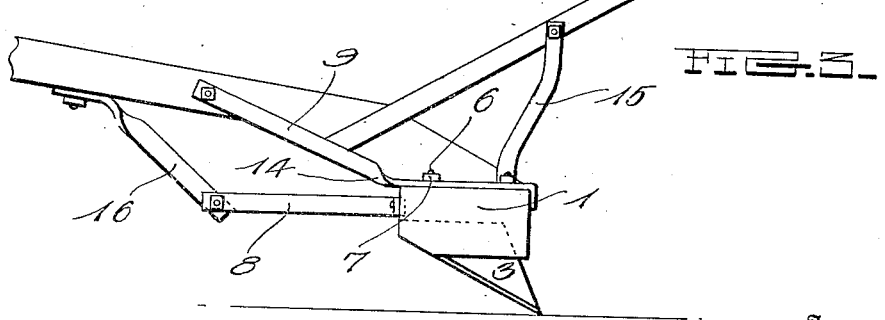
Witness
George W. Goodsmith
Inventor
G. W. Stuart
By H. R. Williamson
Attorneys G. W. STUART.
VINE CUTTER.
APPLICATION FILED NOV. 13, 1919.
1,350,529. Patented Aug. 24, 1920.
2 SHEETS—SHEET 2.
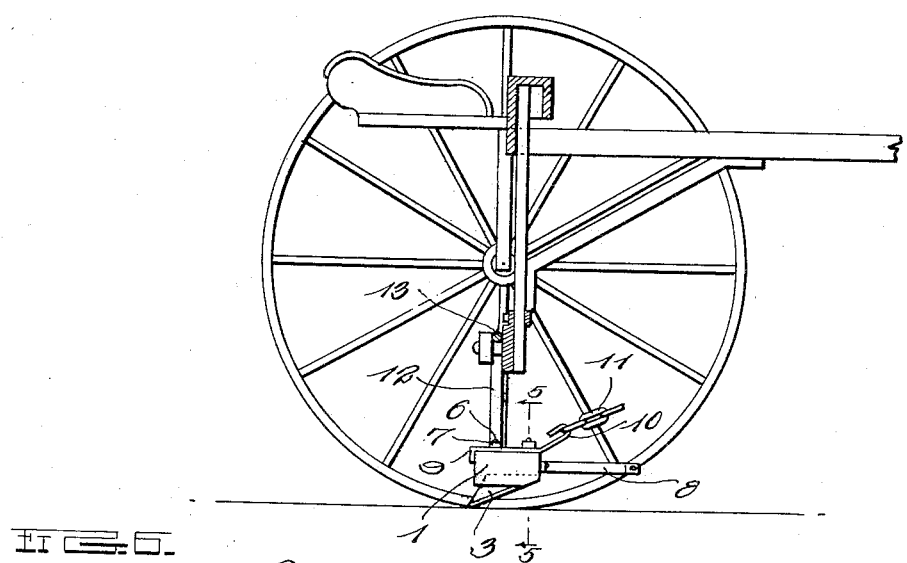
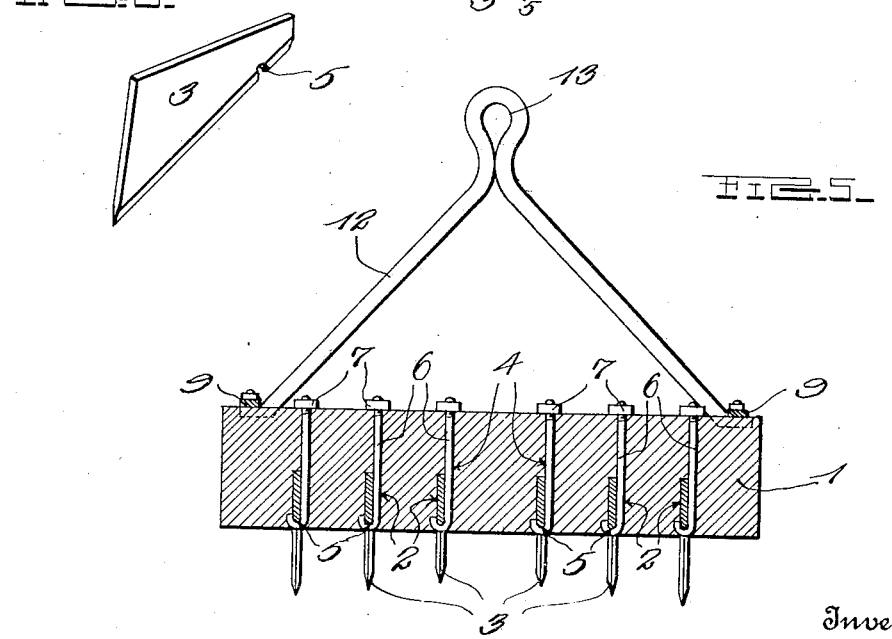
Witness
George H. Giovannetti
Inventor
G. W. Stuart
By H. R. Wilson & Co.
Attorneys

UNITED STATES PATENT OFFICE.

GEORGE W. STUART, OF BAY MINETTE, ALABAMA.

VINE-CUTTER.

1,350,529.  Specification of Letters Patent.  Patented Aug. 24, 1920.

Application filed November 13, 1919. Serial No. 337,648.

*To all whom it may concern:*

Be it known that I, GEORGE W. STUART, a citizen of the United States, residing at Bay Minette, in the county of Baldwin and State of Alabama, have invented certain new and useful Improvements in Vine-Cutters; and I do declare the following to be a full, clear, and exact description of the invention, such as will enable others skilled in the art to which it appertains to make and use the same.

This invention relates to improvements in vine cutters, and it has more particular reference to a vine cutter attachment which is especially designed to be used in connection with a conventional form of cultivator, although it may also be used with various other types of supporting members.

The principal object of the invention is to provide an attachment of the above mentioned character which may be ready and easily attached to a suitable supporting member, such as a cultivator, plow, or the like, whereby it may be drawn over a row of sweet potato vines for instance, to sever them so that the potatoes may be plowed up after the vines have been removed, thus preventing interference of the vines with the action of the plow.

Another object of the invention is to provide an attachment of the above mentioned character which is exceedingly simple in construction, yet highly efficient in use, one which is strong, durable, and inexpensive to both the manufacturer and the user.

Other objects and advantages of the invention will become apparent during the course of the following description.

In the accompanying drawings forming a part of this specification and in which like numerals are employed to designate like parts throughout the same, Figure 1 is a perspective view of a device constructed in accordance with my invention.

Fig. 2 is a transverse section thereof.

Fig. 3 is a side elevation of a plow frame equipped with the attachment.

Fig. 4 is a side elevation of a conventional type of a cultivator equipped with the attachment.

Fig. 5 is a section taken on the plane of the line 5—5 in Fig. 4.

Fig. 6 is a detail perspective view of one of the cutting knives or blades.

In the drawings wherein for the purpose of illustration is shown a preferred embodiment of my invention, the numeral 1 indicates a blade carrying or retaining block which may be constructed of wood or metal, whichever is desired. This block is preferably rectangular in shape and it is provided on its under face or bottom with a plurality of spaced transversely extending grooves or slots 2 which extend from the front edge thereof to a point adjacent the back edge, and these slots serve to receive the cutting blades 3 therein. In addition to the slots 2, the block is also provided with a plurality of vertical holes 4 which extend through it and intersect the slots. As shown in Fig. 6, each blade is substantially triangular in configuration and is provided with a notch 5 in its cutting edge, the purpose of which will hereinafter be set forth. I employ bolts 6 to retain the blades in position in the slots 2, and each bolt has a hook formed on its lower end so as to permit it to engage in the notch 5 in the blade. It is obvious that by tightening the nuts 7 the blades will be held tightly in the slots 2. With this construction it will be seen that the blades may be removed for repairing, resharpening, etc. All of the blades are not of the same size, that is, the blades in the center are smaller in size than the blades near the ends of the block 1. In other words, I vary the distance of the cutting edge of each blade from the bottom of the block to form a substantial arch arrangement thereof, whereby they will conform to the shape of the ridges or hills over which they are drawn. As before stated, this cutter is especially intended to cut sweet potato vines, and such vines grow at any and all angles with respect to the hills in which they are planted, thus making it rather difficult to bring the cutting edges of the blades into them at the most effective angle for easy severing of them. In other words, some of the vines lie crosswise to the hills and others lie lengthwise and in order to make sure of cutting all of the vines I desire to provide means for guiding the vines beneath the cutting edges of the blades. To this end I attach, in any suitable manner, a substantially V-shaped separator or spreader 8 to the front edge of the block so that when the device is drawn over top of the vines, the spreader will engage them, deflect them laterally, and guide them beneath the inclined cutting blades 3 at the proper angle for effective cutting, as is obvious.

In most instances I desire, and have found it convenient, to attach the device to a conventional type of cultivator. I have illustrated the manner in which it is attached to a cultivator in Fig. 4. In order to permit it to be readily attached to, and detached from the cultivator, I employ suitable attaching means carried by the block 1 as shown more particularly in Fig. 1. This attaching means may be of any suitable construction, but I prefer to employ two metal strips 9 which are bolted or otherwise fastened to the block 1 near the ends, and extend forwardly beyond it. The outer extremity of each strip is bent upon itself to form a hook 10 and a chain or other fastening device 11 is secured in the hook. When a chain is employed for the purpose, one end is secured in the hook 10 and the other end secured or attached to a suitable place on the cultivator frame. In addition to these strips 9, I also employ another attaching member which I have designated by the numeral 12. This member 12 is also substantially V-shaped in configuration and it is bent between its ends to form an eye 13 by means of which it is fastened to the cultivator frame in the manner shown.

Inasmuch as there is a greater number of people who do not own, and can not afford to buy a cultivating machine, I desire to provide means, carried by the block 1, which will permit the device to be attached to an ordinary plow. By referring to Fig. 3, an idea of the manner in which it is connected to plow, will be had. In this construction it will be seen that the same type of bars 9 is employed as have already been described, but instead of bending the free ends of these bars to form hooks, I merely twist each bar as at 14 and secure the outer free end to the tongue of the plow. Instead of the type of attaching member employed with a cultivator, I will use suitable attaching bars or strips 15, each of which is secured at its lower end to the blade carrier 1 and at its opposite end to the handle of the plow. I may also employ similar strips 16 as an additional means of supporting the blade carrier. As shown these strips 16 are attached to the spreader 8 and the tongue of the plow frame.

I desire to emphasize here that the slots 2 do not extend entirely across the bottom of the block, but extend only from the front edge to a point near the back edge, thus it will be seen that one end of the slot is closed and when the blade 3 is placed therein it bears against the closed end. As shown, the closed end of the slot is rearwardly inclined and so is the rear edge of the blade, which construction prevents the blades from becoming accidentally lost, as might otherwise occur. It should also be noted that the spaces between all of the blades are not equal (Fig. 5). That is, the two blades nearest the center are spaced farther from each other than the remaining blades. This construction is designed to prevent the blade from cutting the potatoes, should the latter be too near the surface. In other words, the potatoes are generally planted near the center of a ridge or hill, and as this device is drawn along this ridge, the blades might go deep enough to cut the potato, so by spacing the two central blades properly it will be seen that they will straddle the potatoes and not come into contact with them.

While I have described my device as being used in connection with sweet potato vines, I desire it to be understood that it may be used equally as well with any other type of vines, weeds, etc.

The manner of assembling the parts, and the operation of the device are thought to be obvious from the foregoing description; therefore, further description is deemed unnecessary.

It is to be understood that the form of my invention herein shown and described is to be taken as the preferred form thereof, and that various minor changes in the shape, size, and arrangement of parts may be resorted to without departing from the spirit of the invention or the scope of the subjoined claims.

I claim:

1. A vine cutter comprising a blade-carrying block elongated transversely of the line of draft, a plurality of rearwardly and downwardly inclined blades secured to the bottom of said block and disposed parallel to the line of draft, and a substantially V-shaped spreader secured to the front edge of said block and extending forwardly beyond it, whereby when the device is drawn over the vines, the spreader will engage and deflect them laterally and downwardly beneath the cutting edges of the blades.

2. A vine-cutter comprising a blade carrying member, and a plurality of spaced rearwardly and downwardly inclined blades secured to the bottom of the carrying member, the cutting edges of the blades being of different distances from the bottom of the carrying member, the distance of the blades nearest the ends of the carrying member being the greatest and the distances of the others being gradually decreased toward the center of the carrying member, whereby the blades will conform to the shape of the ridges over which they are drawn.

3. A vine-cutter comprising a blade carrying block having a plurality of spaced transverse slots in its bottom, a cutting blade fitted in each slot, and a plurality of hook-shaped fastening bolts, each bolt being extended through the block and engaged with the blades to retain the latter in the slots.

4. A vine-cutter comprising a blade carrying block having a plurality of spaced slots in its bottom, said slots extending transversely thereof from the front edge to a point adjacent the black edge, a plurality of substantially triangular cutting blades fitted in said slots and abutting the rear walls thereof, each blade being provided with a notch, and a plurality of hook-shaped bolts extending through the block and having their lower hooked-ends engaged in the notches in the blades to retain them in the slots.

In testimony whereof I have hereunto set my hand.

GEORGE W. STUART.